(12) United States Patent
Muraki

(10) Patent No.: US 6,454,268 B1
(45) Date of Patent: Sep. 24, 2002

(54) SHAFT SEAL DEVICE

(75) Inventor: Ryoji Muraki, Niigata-ken (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 09/779,479

(22) Filed: Feb. 9, 2001

(51) Int. Cl.[7] .............................................. F16J 15/34
(52) U.S. Cl. ........................................ 277/361; 277/400
(58) Field of Search ................................ 277/368, 369, 277/399, 400, 408, 361, 366, 367

(56) References Cited

U.S. PATENT DOCUMENTS

| | | | |
|---|---|---|---|
| 3,744,805 A | * 7/1973 | Heinrich ..................... | 277/400 |
| 4,290,611 A | 9/1981 | Sedy | |
| 4,889,348 A | 12/1989 | Admundson et al. | |
| 5,071,141 A | 12/1991 | Lai et al. | |
| 5,092,612 A | 3/1992 | Victor et al. | |
| 5,116,066 A | * 5/1992 | Crawford ..................... | 377/372 |
| 5,180,173 A | * 1/1993 | Kimura et al. .............. | 277/400 |
| 5,224,714 A | * 7/1993 | Kimura et al. .............. | 277/400 |
| 5,249,812 A | * 10/1993 | Volden et al. ............... | 277/361 |
| 5,312,117 A | * 5/1994 | Takenaka et al. ........... | 277/400 |
| 5,375,853 A | * 12/1994 | Wasser et al. ............... | 277/366 |
| 5,421,593 A | 6/1995 | Artisubo et al. | |
| 5,447,316 A | * 9/1995 | Matsui ....................... | 277/400 |
| 5,454,572 A | * 10/1995 | Pospisil ..................... | 277/368 |
| 5,468,002 A | * 11/1995 | Wasser ....................... | 277/361 |
| 5,489,105 A | * 2/1996 | Attenasio et al. ........... | 277/361 |
| 5,498,007 A | * 3/1996 | Kulkarni et al. ............ | 277/366 |
| 5,529,315 A | * 6/1996 | Borrino et al. ............. | 277/352 |
| 5,529,318 A | * 6/1996 | Fuse et al. .................. | 277/400 |
| 5,941,532 A | * 8/1999 | Flaherty et al. ............. | 277/399 |
| 6,325,280 B1 | * 12/2001 | Feigl et al. ................. | 277/352 |

FOREIGN PATENT DOCUMENTS

DE 383214 A1 4/1990

* cited by examiner

Primary Examiner—Anthony Knight
Assistant Examiner—John L. Beres
(74) Attorney, Agent, or Firm—Oliff & Berridge, PLC

(57) ABSTRACT

A shaft seal device including a casing having a hollow portion, a rotable shaft extending inside the casing from a sealed fluid region to an outer region, a non-contact type first mechanical seal arranged between the casing and the shaft so as to divide the hollow portion into the sealed fluid region and a purge region located between the sealed fluid region and the outer region, and a second mechanical seal arranged between the casing and the shaft so as to divide the hollow portion into the purge region and the outer region. The first mechanical seal includes a first rotating seal ring having a first rotating seal surface rotating along with the shaft and a first non-rotating seal ring held by the casing and having a first non-rotating seal surface able to abut axially and slidable against the first rotating seal surface, a plurality of first hydrodynamic grooves communicating with the purge region formed at the first rotating seal surface or the first non-rotating seal surface so as to extend from an inner circumferential edge thereof to an outer circumferential edge direction, and a purge fluid higher in pressure than the pressure of the sealed fluid fed into the purge region.

7 Claims, 4 Drawing Sheets

SHAFT SEAL DEVICE

BACKGROUND OF THE INVENTION

1. Field of the Invention

The present invention relates to a shaft seal device to be used in for example a pump or other fluid machine, more particularly relates to a shaft seal device suitable when the sealed fluid is a fluid containing slurry or a high viscosity fluid etc.

2. Description of the Related Art

In a pump or other fluid machine, a shaft is provided rotatably in a casing. A shaft seal device is provided to prevent the fluid in the casing from leaking outside from the clearance between the shaft and the casing.

As a shaft seal device used in such a fluid machine, a mechanical seal is known. Sealing the clearance between a rotating shaft and a casing holding the shaft rotatively requires that a rotating seal ring rotating together with the shaft and a non-rotating seal ring fixed to the casing be brought into contact at the seal surfaces. At the seal surfaces, the wear between the rotating seal ring and the non-rotating seal ring becomes a problem. Therefore, recently, as shown in for example U.S. Pat. Nos. 5421593 and 4290611 and German Patent Publication DE3834214A1, a non-contact type mechanical seal provided with hydrodynamic grooves at the seal surface of the rotating seal ring and preventing the seal surfaces from contact together with rotation of the shaft has been proposed.

As the shape of the hydrodynamic grooves of the non-contact type mechanical seal, there are known spiral shaped ones as shown in U.S. Pat. No. 5071141 and T-shaped ones as shown in U.S. Pat. No. 5,092,612.

However, the dynamic pressure generating grooves of the non-contact type mechanical seal of the related art are formed at the outer diameter side of the rotating seal ring. Therefore, when using this non-contact type mechanical seal as a seal structure between the sealed fluid region and the purge gas region, the sealed fluid easily penetrates into the dynamic pressure generating grooves, so th at various problems occur to the seal surface induced by the sealed fluid. In particular, when the sealed fluid was a slurry or high viscosity liquid, there was the problem that the seal easily became incomplete due to wear at the seal surface.

Note that, as shown in U.S. Pat. No. 5,092,612, a non-contact type mechanical seal where hydrodynamic grooves are formed not only at the outer diameter side of the rotating seal ring, but also the inner diameter side is itself known. In the structure combining a plurality of mechanical seals into a system through purge region, using a mechanical seal formed with hydrodynamic grooves at only the inner diameter side of the rotating seal ring as the seal structure between the sealed fluid region and the purge gas region, however, was first proposed by the present inventors.

Further, U.S. Patent No. 5,421,593 proposes a seal structure using a contact type mechanical seal as the seal structure between the sealed fluid region and the purge gas region and making the pressure of the purge gas region lower than the pressure of the sealed fluid region. When using a contact type mechanical seal as the seal structure between the sealed fluid region and the purge gas region, however, the partial wear at the seal surfaces becomes severe and the durability becomes inferior. In particular, when slurry fluid is to be sealed, the wear at the seal surface becomes a problem. The sealed fluid leaks to the purge gas region having a low pressure and as a result may leak outside the casing. When the sealed fluid is a corrosive liquid, the seal components arranged in the purge gas region may be corroded and the durability of the seal device remarkably reduced.

In the seal structure described in this specification (U.S. Pat. No. 5,421,593), by just replacing the contact type mechanical seal with a conventional non-contact type mechanical seal, the pressure of the sealed fluid act as a back pressure onto the seal ring directly. Further, the sealed fluid penetrates into the hydrodynamic grooves formed at the outer diameter side of the seal ring, so that it induces the problem that the sealed fluid enters into the purge region having low pressure.

SUMMARY OF THE INVENTION

The present invention was made in consideration of this situation and has as its object to provide a shaft seal device with little wear at the seal surface, superior in durability, resistant to penetration of the sealed fluid into the purge region, and superior in sealability.

To achieve the above object, according to the present invention, there is provided a shaft seal device comprising:

a casing having a hollow portion, a rotatable shaft extending inside the casing from a sealed fluid region to an outer region, a non-contact type first mechanical seal arranged between the casing and the shaft so as to divide the hollow portion into the sealed fluid region and a purge region located between the sealed fluid region and the outer region, and a second mechanical seal arranged between the casing and the shaft so as to divide the hollow portion into the purge region and the outer region, wherein the first mechanical seal comprises a first rotating seal ring having a first rotating seal surface rotating along with the shaft and a first non-rotating seal ring held by the casing and having a first non-rotating seal surface able to be pushed axially and slidable against the first rotating seal surface, a plurality of first hydrodynamic grooves communicating with the purge region formed at the first rotating seal surface or the first non-rotating seal surface so as to extend from an inner circumferential edge thereof to an outer circumferential edge direction, and a purge fluid higher in pressure than the pressure of the sealed fluid fed into the purge region.

In the shaft seal device according to the present invention, it is possible to effectively prevent the entry of the sealed fluid into the purge region by the co-action between the purge fluid having a higher pressure than the pressure of the sealed fluid and the plurality of the first hydrodynamic grooves communicating with only the inner circumferential edge in the seal surface. That is, a sliding surface clearance is formed between the first rotating seal ring and the first non-rotating seal ring of the first mechanical seal by the action of the first hydrodynamic grooves. The first hydrodynamic grooves communicate only with the inner circumferential edge in the seal surface, so the purge fluid in the purge region is drawn into the first hydrodynamic grooves by the centrifugal force. Therefore, a barrier layer formed by the purge fluid is formed in the sliding surface clearance and it is possible to effectively prevent the sealed fluid from entering the purge region from the outer diameter side of the first mechanical seal.

Further, in the present invention, the first mechanical seal is non-contact type seal structure, so there is little wear of the seal ring and the durability is excellent. Further, due to an action of purge fluid spouting into the sealed fluid region etc., even if the sealed fluid is a slurry etc., an effective seal becomes possible.

Preferably, the pressure of the purge fluid in the purge region acts as a back pressure into a back surface of the first non-rotating seal ring located at an opposite side of the first non-rotating seal surface, and the first hydrodynamic grooves communicate with the purge region through an inner diameter hollow portion located at an inner circumferential side of the first non-rotating seal ring.

Because a back pressure of the purge fluid acts into a back surface of the first non-rotating seal ring, the first non-rotating seal surface of the first non-rotating seal ring is pushed axially against the first rotating seal surface of the first rotating seal ring. As a result, when a shaft doesn't rotate, sealability between the seal surfaces improves.

Further, purge fluid acts into the inner circumferential surface of the first seal ring, so it is possible to make a configuration that easily introduces the purge fluid into the first hydrodynamic grooves.

Prefarably, the first rotating seal ring and the first non-rotating seal ring are made of a hard material in a hardness higher than that of a carbon. The hard material is not particularly limited, but may be SiC, tungsten carbide, a ceramic coated material, etc.

By making the first non-rotating seal ring using a hard material, its mechanical strength improves and even if the purge fluid acts from the inner circumferential side, harmful deformation doesn't occur on the seal surface. Further,by making the first rotating seal ring and the first non-rotating seal ring by a hard material, it is possible to further reduce the wear of the seal ring as well as to prevent seal ring from deformation, and possible to improve the durability. In particular, even when the sealed fluid is slurry, it is possible to further reduce the wear of the seal ring.

Preferably, each of the first hydrodynamic grooves has an L-shape seen from the seal surface and comprises a first radial portion communicating directly with the purge region and a first circumferential portion communicating with an outer diameter portion of the first radial portion and extending in the circumferential direction and the mutually adjoining first hydrodynamic grooves are arranged line symmetrically.

By arranging the mutually adjoining first hydrodynamic grooves line symmetrically, even if the direction of rotation of the shaft becomes reverse, one of the first hydrodynamic grooves arranged line symmetrically functions and a sufficient clearance is formed between the seal surfaces. Note that the first hydrodynamic grooves are not limited to L-shapes and may also be T-shapes or spiral shapes.

Preferably, the second mechanical seal comprises a second rotating seal ring having a second rotating seal surface rotating along with the shaft and a second non-rotating seal ring held by the casing and having a second non-rotating seal surface able to be pushed axially and slidable against the second rotating seal surface, and a plurality of second hydrodynamic grooves are formed at the second rotating seal surface or the second non-rotating seal surface.

The pressure of the purge region is higher than the pressure of the outer region, so the purge fluid in the purge region enters to the second hydrodynamic grooves, forms a sliding clearance between the seal surfaces together with the rotation of the shaft, and forms a barrier layer of the purge fluid. Due to the purge layer, it is possible to seal the purge region and the outer region.

Preferably, the second non-rotating seal ring is constructed so that the pressure of the purge fluid acts as a back pressure into a back surface of the second non-rotating seal ring located at an opposite side of the second non-rotating seal surface.

Because a back pressure of the purge fluid acts into a back surface of the second non-rotating seal ring, the second non-rotating seal surface of the second non-rotating seal ring is pushed axially against the second rotating seal surface of the second rotating seal ring. As a result, when a shaft doesn't rotate, sealability between the seal surfaces improves.

Preferably, one of the second rotating seal ring and the second non-rotating seal ring is made of a material mainly consisting of carbon. By making one of the mutual sliding members out of carbon, which is superior in slidability, the sealing property is further improved.

Preferably, each of the second hydrodynamic grooves has an L-shape and comprises a second radial portion communicating directly with the purge region and a second circumferential portion communicating with the inner diameter portion of the second radial portion and extending in the circumferential direction.

The mutually adjoining second hydrodynamic grooves are arranged line symmetrically.

By arranging the mutually adjoining second hydrodynamic grooves line symmetrically, even if the direction of rotation of the shaft becomes reverse, one of the second hydrodynamic grooves arranged line symmetrically functions and a sufficient clearance is formed between the seal surfaces. Note that the second hydrodynamic grooves are not limited to L-shapes and may also be T-shapes or spiral shapes.

Further, the second hydrodynamic grooves may be formed from the outer circumferential edge to inner direction or may be formed from the inner circumferential edge to outer direction. When it is formed from inner circumferential edge to outer direction, it is possible to maintain the pressure of the purge region for a long period.

Preferably, when the sealed fluid is a liquid, it is better the maximum depth of the first hydrodynamic grooves is larger than the maximum depth of the second hydrodynamic grooves. These depths are within an order of microns or ten microns.

When the sealed fluid is a liquid and the purge fluid is nitrogen gas or another inert gas, a seal is formed between the liquid and gas at the first mechanical seal and a seal is formed between the gas and gas at the second mechanical seal. In this case, by making the maximum depth of the first hydrodynamic grooves larger than the maximum depth of the second hydrodynamic grooves, it is possible to improve the sealing property between the gas and liquid at the first mechanical seal.

In the present invention, the sealed fluid is not particularly limited and may be a liquid containing slurry or a high viscosity liquid. Specifically, the sealed fluid may be a plating solution, a cleaning use chlorine solution, or other corrosive liquid and may be a hot monomer etc.

BRIEF DESCRIPTION OF THE DRAWINGS

Below, the present invention will be explained based on the embodiments shown in the drawings. Here.

DESCRIPTION OF THE PREFERRED EMBODIMENTS

Figure 1:
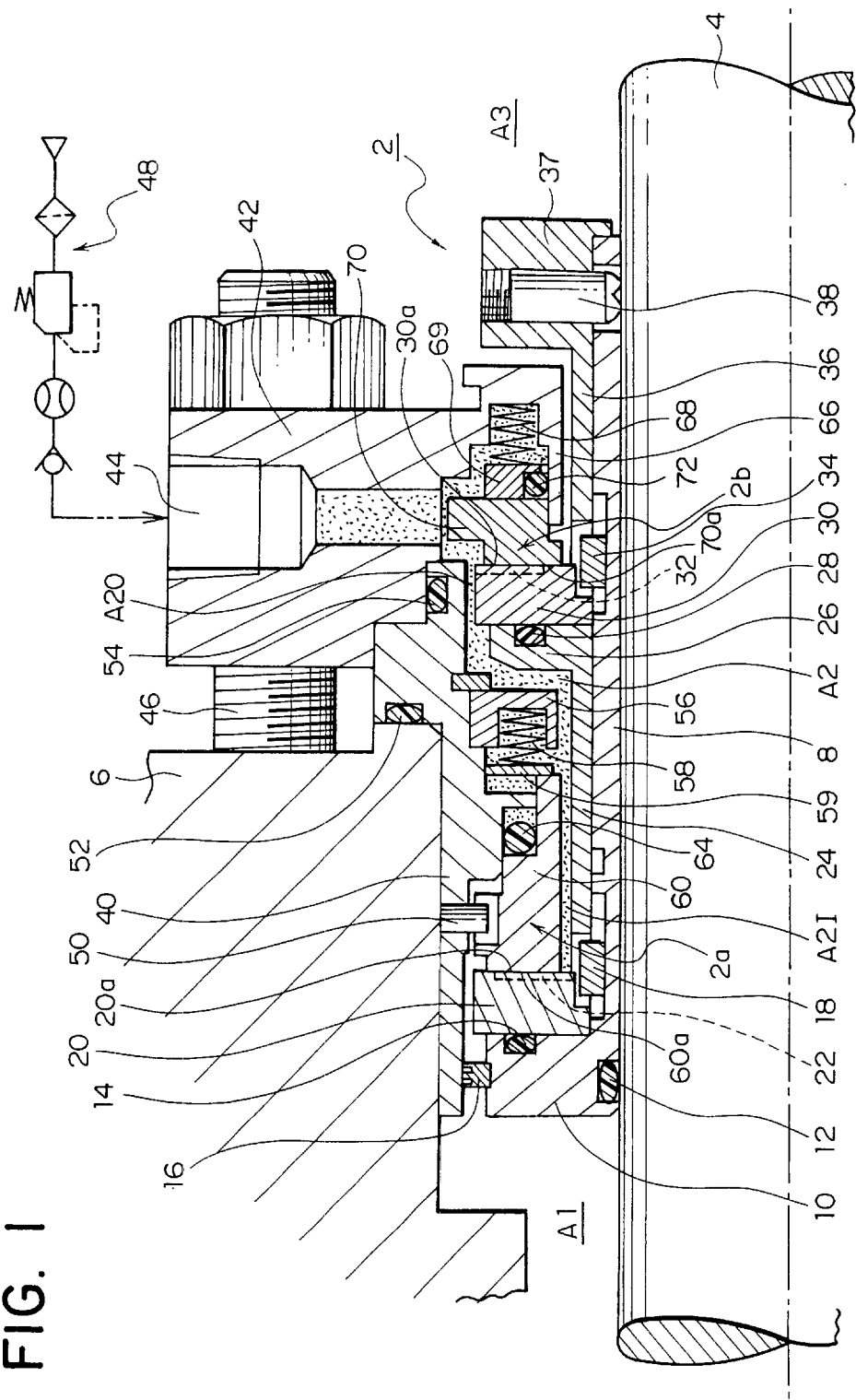
FIG. 1 is a half sectional view of a shaft seal device according to a preferred embodiment of the present invention.

As shown in FIG. 1, the shaft seal device 2 according to the present embodiment is a device for sealing the clearance between a rotatable shaft 4 and casing 6 of a pump or other fluid machine. The shaft 4 extends through the inside of the casing 6 from the sealed fluid region A1 to the outer region A3. The sealed fluid region A1 enclosed by the casing 6 holds for example a slurry. The outer region A3 is an atmospheric region in the present embodiment.

The shaft seal device 2 has non-contact type first and second mechanical seals 2a and 2b arranged so as to form a purge region A2 between the sealed fluid region Al and outer region A3 along the shaft 4. The first mechanical seal 2a is arranged at the sealed fluid region A1 side, while the second mechanical seal 2b is arranged at the outer region A3 side.

A first sleeve 8 is engaged over and fixed to the outer circumference of the shaft 4. The sleeve 8 is designed to be able to rotate around the axial center along with the shaft 4. A flange 10 is formed integrally at the sealed fluid region Al side in the axial direction at the sleeve 8. An O-ring groove is formed in the inner circumferential surface of the flange 10. The O-ring 12 is housed there and prevents the flow of the fluid in the sealed fluid region A1 between the sleeve 8 and the shaft 4. The material of the O-ring 12 is selected in accordance with the type of the liquid in the sealed fluid region A1 and is made of for example a synthetic rubber etc.

A labyrinth seal ring 16 is mounted at the outer circumference of the flange 10. The labyrinth seal ring 16 comprises a plurality of projections and grooves alternately formed along the axial direction in the outer circumferential surface. These projections slide on the inner circumferential surface of the first seal housing 40 fixed to the inner circumferential surface of the casing 6 and seals the clearances. The labyrinth seal ring 16 is made of for example PTFE or another fluororesin. Note that there are other embodiments that don't use this labyrinth seal ring 16 in the present invention.

An O-ring groove is formed in the surface of the flange 10 opposite to the sealed fluid region Al. An O-ring 14 is fit there. The O-ring 14 is pressed against the rear end face of the first rotating seal ring of the first mechanical seal 2a and seals the space between the first rotating seal ring 20 and the flange 10. The O-ring 14 is made of a material the same as the O-ring 12 for example.

A key groove is formed in the inner circumferential surface of the first rotating seal ring 20. A key 18 fixed to the sleeve 8 is engaged with the key groove. Therefore, the first rotating seal ring 20 is fit rotatably over the sleeve 8 and can rotate together with the shaft 4. The first hydrodynamic grooves 22 are formed at the front end face of the first rotating seal ring. Details of the first hydrodynamic grooves 22 will be explained in depth later based on FIG. 2. The first rotating seal ring 20 is made of SiC, tungsten carbide, ceramic coating material, or another hard material.

A second sleeve 24 is fixed by fitting over the outer circumference of the first sleeve 8 at the center in the axial direction. The second sleeve 24 engages with the key 18 attached to the first sleeve 8. The two are designed to rotate together along with the shaft 4. A flange 26 is formed integrally with the axial direction end of the outer region A3 in the second sleeve 24. An O-ring groove is formed at the end face of the flange 26. The O-ring 28 is fit there. The O-ring 28 is pressed against the rear surface of the second rotating seal ring 30 comprising the second mechanical seal 2b and seals the clearance.

The O-ring 28 may be made of the same material as the O-rings 12. The O-ring 28 is arranged in the purge region A2. In the normal state, it does not contact the liquid of the sealed fluid region A1, so can be made of a material less expensive than the O-rings 12 and 14.

A key groove is formed in the inner circumferential surface of the second rotating seal ring 30. A key 34 fixed to the sleeve 8 is engaged with the key groove. Therefore, the second rotating seal ring 30 is fit rotatably over the sleeve 8 and can rotate together with the shaft 4. The second hydrodynamic grooves 32 are formed at the front end face of the second rotating seal ring 30. Details of the second dynamic pressure generating grooves 32 will be explained in depth later based on FIG. 3. The second rotating seal ring 30 is made of SiC, tungsten carbide, ceramic coating material, or another hard material.

The sleeve collar 36 is fixed by a set screw 38 to the outer circumference of the outer region A3 side in the first sleeve 8 and can rotate together with the shaft 4. A fixing flange 37 is formed integrally at the axial direction end of the outer region A3 side of the sleeve collar 36.

A first seal housing 40 and a second seal housing 42 are fixed detachably by a bolt 46 to the outer region side end of the casing 6. The first seal housing 40 is fixed by being sandwiched between the second seal housing 42 and the casing 6. A connection port 44 is formed for feeding purge gas (purge fluid) in the second seal housing 42. Purge gas can be fed into the purge region A2 from there. A purge gas feeding device 48 is connected to the connection port 44 for the purge gas.

The purge gas feeding device 48 for example includes a purge gas feeding source, a dust removal filter, a pressure regulation device, a pressure gauge, flow meter, and a check valve. The purge gas feeding device 48 feeds purge gas of a pressure higher than the liquid pressure of the sealed fluid region A1 in the purge region A2 through the connection port 44. Note that the purge gas is not particularly limited, but for example nitrogen gas or another inert gas is preferable, and may be air. The pressure of the purge gas is preferably 0.2 to 0.3 MPa higher than the liquid pressure of the sealed fluid region A1 in the purge region A2. It is set according to the pressure of the sealed fluid.

Further, a fluid feeding control device may be formed to discharge the predetermined purge gas in the purge region A2 in accordance with need.

Two O-ring grooves are formed in the outer circumference of the first seal housing 40. The O-ring 52 fit in one O-ring groove is pushed against the end face of the casing 6 and seals the clearance between the first seal housing 40 and the casing 6. Further, the O-ring 54 fit in the other O-ring groove is pushed against the inner circumferential surface of the second seal housing 42 and seals the space between them.

A ring-shaped retainer 56 is detachably fixed to the inner circumferential surface of the first seal housing 40 near the flange portion 26 of the second sleeve 24 so as to not directly contact the second sleeve 24. The base end of a compression spring is held in the axial direction recess of the retainer 56. The tip end of the compression spring 58 contacts the ring-shaped push plate 59 and pushes the push plate 59 in the axial direction away from the retainer 56.

The push plate 59 is designed to push the first non-rotating seal ring 60 of the first mechanical seal 2a against the seal surface 20a of the first rotating seal ring 20 by the pressure of the spring 58. The first non-rotating seal ring 60 is arranged at the inner circumferential side hollow portion of the first seal housing 40 and is connected to the first seal housing 40 non-rotatably by a knock pin 50. This first non-rotating seal ring 60 is connected freely movable in the axial direction against casing 6 by the length in the axial direction of a long solt formed in the outer circumference. An O-ring 64 is fit between the first seal housing 40 and the first non-rotating seal ring 60 and seals the clearance. The material of the O-ring 64 is for example the same material as the O-ring 12. The material of the first non-rotating seal ring 60 may be a carbon material, but in the present embodiment it is made of SiC, tungsten carbide, ceramic coating material, or another hard material, the same as the first rotating seal ring 20. Note that the seal surface 20a of the first rotating seal ring 20 is substantially perpendicular to the axis of the shaft 4, but in accordance with need, may be a slope.

In this embodiment, the O-ring 64 is arranged at the back side opposite to the first non-rotating seal surface 60a of the first non-rotating seal ring 60. And the pressure of the buffer gas acts O-ring 64 and the back side of the seal ring 60 and pushes the seal ring 60 against the seal surface 20a of the first rotating seal ring 20.

A retainer 66 is formed integrally at the inner circumference of the second seal housing 42. A compression spring 68 is attached to the retainer 66. The tip end of the compression spring 68 contacts the push ring 69 and pushes the push ring 69 in the axial direction toward the first non-rotating seal ring 60.

The push ring 69 is designed to push the second non-rotating seal ring 70 of the second mechanical seal 2b against the seal surface 30a of the second rotating seal ring 30 by the spring force of the spring 68. The second non-rotating seal ring 70 is arranged at the inner circumferential side hollow portion of the second seal housing 42 and is connected to the second seal housing 42 non-rotatably and freely movably in the axial direction by a not shown knock pin 50. An O-ring 72 is fit among the push ring 69, second non-rotating seal ring 70, and retainer 66 and seals the clearances between them. The material of the O-ring 72 is for example is the same material as the O-ring 28. The material of the second non-rotating seal ring 70 in the present embodiment is for example carbon, which is superior in lubricating property.

In this embodiment, O-ring 72 is arranged at the back side opposite to the second non-rotating seal surface 70a of the second non-rotating seal ring 70. And the pressure of the purge gas acts as a back pressure and pushes the second non-rotating seal ring 70 against the seal surface 30a of the second rotating seal ring 30.

In the present embodiment, as shown in FIG. 1, in the first and second mechanical seals 2a and 2b, the first and second non-rotating seal rings 60 and 70 are pushed in the same direction (direction of sealed fluid region A1 from the outer region A3) with respect to the first and second rotating seal rings 20 and 30. This configuration is called tandem seal structure. Further, in the first mechanical seal 2a, the outer circumferential side forms part of the sealed fluid region A1, while the inner circumferential side forms part of the purge region A2, that is, the inner diameter side hollow portion A2I. Further, in the second mechanical seal 2b, the outer circumferential side and back side forms part of the purge region A2, that is, the outer diameter side hollow portion A2O, while the inner circumferential side forms part of the outer region A3.

Figure 2:
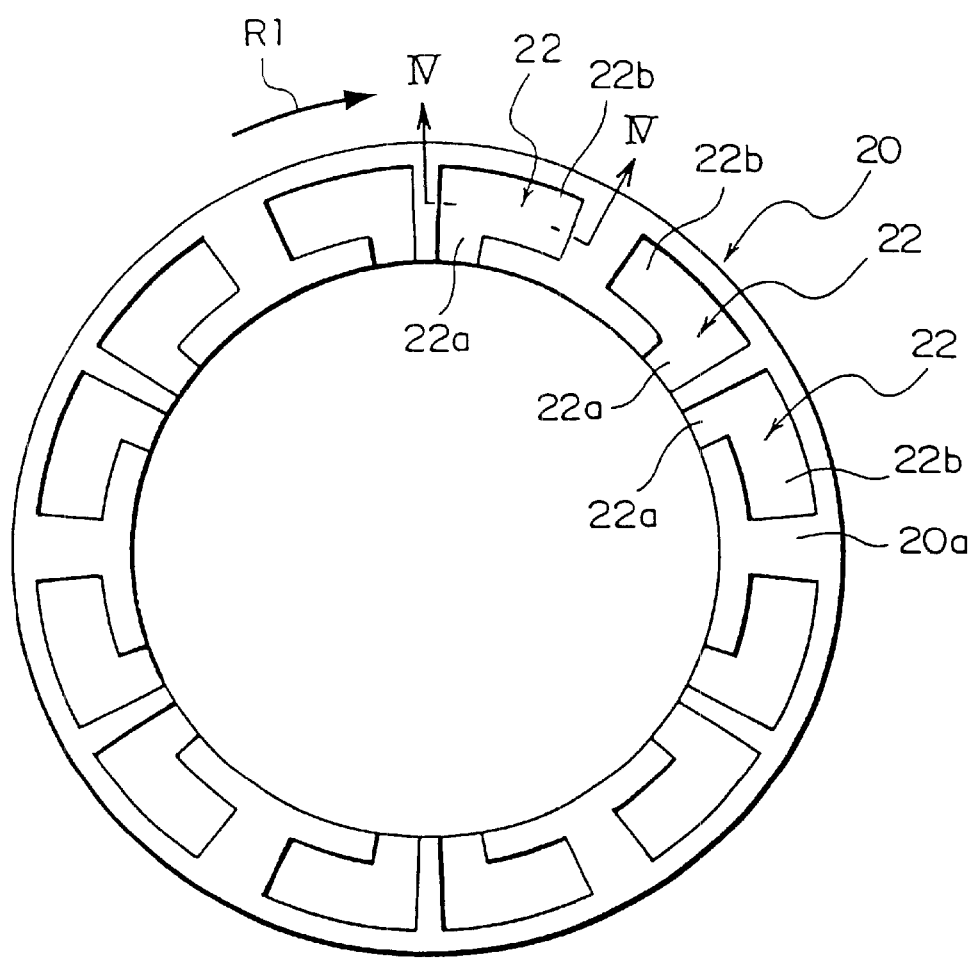
FIG. 2 is a plane view of a plurality of first hydrodynamic grooves formed in the first rotating seal ring shown in FIG. 1.

As shown in FIG. 2, a plurality of first hydrodynamic grooves 22 is formed in the circumferential direction at the seal surface 20a of the first rotating seal ring 20. Each first hydrodynamic groove 22 has an L-shape as seen from a plane view and comprises a first radial portion 22a communicating directly with part of the purge region A2 shown in FIG. 1, that is, the inner diameter side hollow portion A2I, and the first circumferential portion 22b communicating with the outer diameter portion of the first radial portion 22a and extending in the circumferential direction. Further, the pair of mutually adjoining first hydrodynamic grooves 22 are arranged line symmetrically. In the present embodiment, six pairs of mutually symmetric first hydrodynamic grooves 22 are arranged at substantially equal intervals along the circumferential direction of the ring 20.

Figure 4:
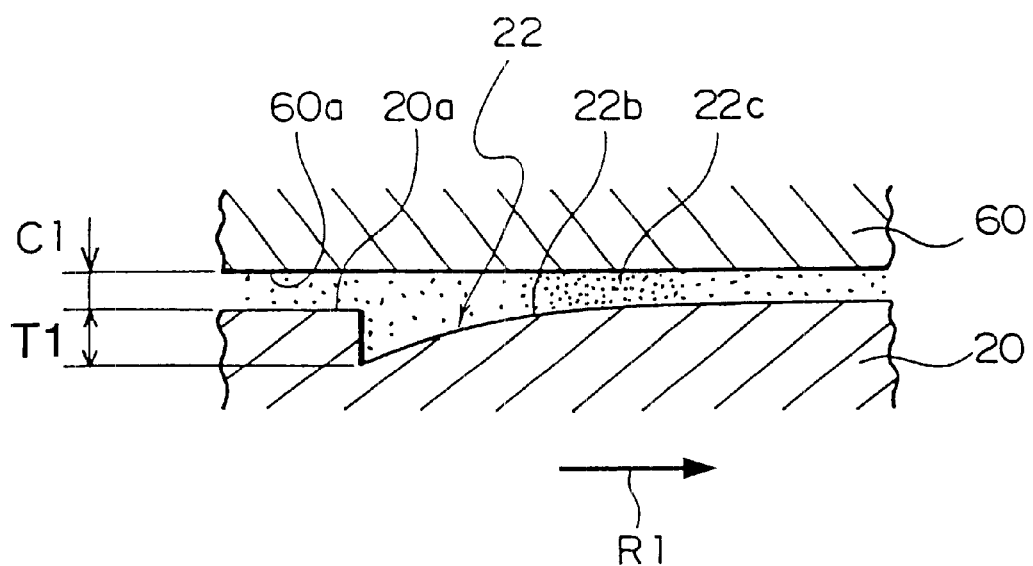
FIG. 4 is a sectional view of key portions along the line IV—IV of FIG. 2.

As shown in FIG. 4, the depth T1 of the first hydrodynamic grooves 22 is not uniform along the circumferential direction of the ring 20. It is deepest where the groove 22 intersects with the radial portion 22a, and shallowest at the other end of circumferential direction. By making the depth of the grooves non-uniform in this way, when the rotating seal ring 20 rotates relative to the non-rotating seal ring 60, the pressure rises at the portion of a shallow depth of the grooves. As a result, a clearance C1 is formed between the seal surface 20a of the rotating seal ring 20 and the seal surface 60a of the non-rotating seal ring 60. The first hydrodynamic grooves 22 are communicated with part of the purge region A2, that is, the inner diameter side hollow portion A2I, so the purge gas in the purge region A2 is drawn into the first hydrodynamic grooves 22. The clearance C1 becomes a barrier layer of a barrier fluid.

Due to this barrier layer, it is possible to effectively prevent entry of the slurry or high viscosity liquid etc. in the sealed fluid region A1 into the purge region A2. This is considered to be due to the following points. First, the first hydrodynamic grooves 22 communicate with part of the purge region A2, that is, the inner diameter side hollow portion A2I, and the gas pressure of the purge region A2 is higher than the liquid pressure of the sealed fluid region A1. Second, this is because the sealed fluid region A1 is positioned at the outer circumferential side of the first mechanical seal 2a and the sealed fluid has difficulty entering the seal surface based on the centrifugal force. Note that when the direction of rotation R1 is opposite, the other hydrodynamic groove 22 in the dynamic pressure generating grooves arranged symmetrically shown in FIG. 2 exhibits a similar action.

Figure 3:
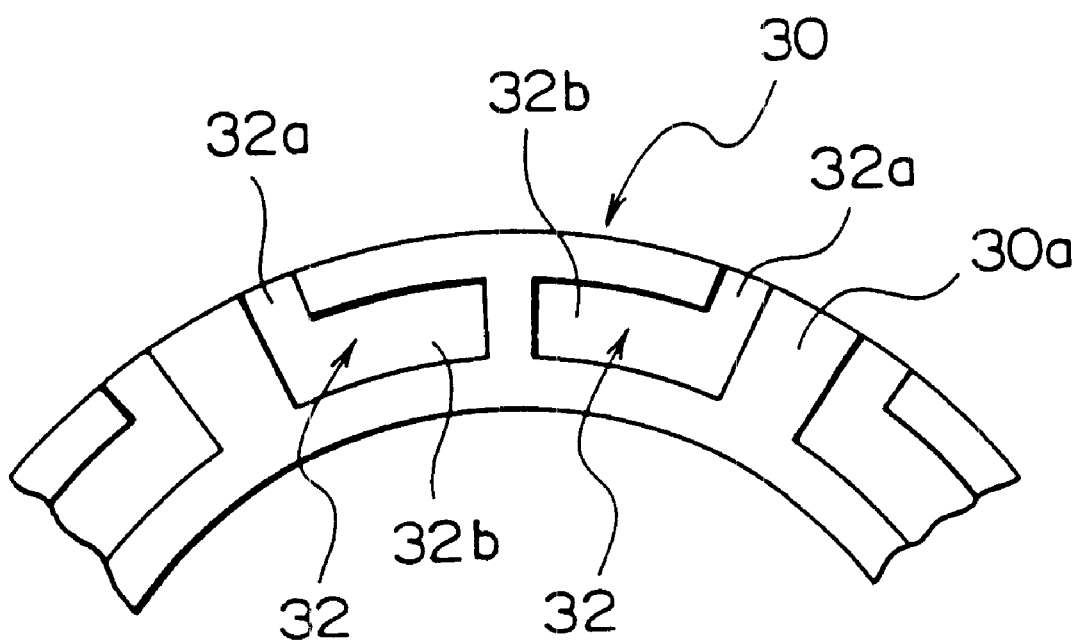
FIG. 3 is a partial plane view of a plurality of second hydrodynamic grooves formed at the second rotating seal ring shown in FIG. 1.

As shown in FIG. 3, a plurality of second hydrodynamic grooves 32 are formed in the circumferential direction at the seal surface 30a of the second rotating seal ring 30. Each second hydrodynamic groove 32 has an L-shape as seen from a plane view and comprises a second radial portion 32a communicating directly with part of the purge region A2 shown in FIG. 1, that is, the outer diameter side hollow portion A2O, and the second circumferential portion 32b communicating with the inner diameter portion of the second radial portion 32a and extending in the circumferential direction. Further, the mutually adjoining pair of second hydrodynamic grooves 32 are arranged line symmetrically. In the present embodiment, six pairs of mutually symmetric second hydrodynamic grooves 32 are arranged at substantially equal intervals along the circumferential direction of the ring 30.

The configuration of each of the second hydrodynamic grooves 32 is the same as the configuration of the first hydrodynamic grooves 22 except for the following points. The first difference is that the second radial portion 32a of the second hydrodynamic grooves 32 communicates with the outer diameter side hollow portion while the first radial portion 22a of the first hydrodynamic grooves 22 communicates with the inner diameter side hollow portion. The second difference is that the maximum depth of the first hydrodynamic grooves 22 is larger than the maximum depth of the second hydrodynamic grooves 32. The reason why the maximum depth of the first hydrodynamic grooves 22 is larger than that of the second hydrodynamic groove 32 is that the design is considered for both liquid and gas use. Note that, in this embodiment, these maximum depths may be the same, and it is set variously in accordance with the design for the sealed fluid.

Due to the second rotating seal ring 30 of the second mechanical seal 2b rotating with respect to the second non-rotating seal ring 70, a barrier layer similar to the first mechanical seal 2a is formed at the seal surfaces 30a between them, and it is possible to seal effectively.

In the shaft seal device 2 according to the present embodiment, it is possible to effectively prevent the entry of the sealed fluid into the purge region A2 by the co-action between the purge fluid having a pressure higher than the pressure of the sealed fluid and the first mechanical seal 2a formed with the plurality of first hydrodynamic grooves 22 communicating with only the inner diameter side hollow portion A2I. That is, a sliding surface clearance C1 is formed by the action of the first hydrodynamic grooves 22 between the first rotating seal ring 20 and the first non-rotating seal ring 60 of the first mechanical seal 2a. The first hydrodynamic grooves 22 communicate with only the inner diameter side hollow portion A2, so the purge fluid in the purge region A2 is drawn into the first hydrodynamic grooves 22 by centrifugal force. Therefore, a barrier layer of the purge fluid is formed in the sliding surface clearance C1, and it is possible to effectively prevent the entry of the sealed fluid from the outer diameter side of the first mechanical seal 2a to the purge region.

Further, in the present embodiment, since the first and second mechanical seals 2a and 2b are both non-contact type seal structures, there is little wear of the seal rings and the durability is superior. Further, since the wear resistance of the first mechanical seal 2a is superior, even if the sealed fluid is slurry etc., an effective seal is possible.

Further, in the present embodiment, the first non-rotating seal ring 60 is made of a hard material, so it is possible to improve the mechanical strength of the first non-rotating seal ring 60, and the configuration that activates the back pressure of the purge fluid from the inner circumferential side is possible.

Still further, in the present embodiment, by arranging the mutually adjoining first hydrodynamic grooves 22 line symmetrically, even if the direction of rotation of the shaft 4 becomes opposite, one of the first hydrodynamic grooves 22 arranged line symmetrically functions and a sufficient clearance C1 is formed between the mutual seal surfaces 20a and 60a. Note that the same applies to the second hydrodynamic grooves 32. Note that the second mechanical seal 2b may be a contact type seal. That is because the second non-rotating seal ring 70 of the second mechanical seal 2b contacts firmly by pressure the seal surface 30a faced the seal surface 70a receiving the pressure of the purge fluid on the back side and it is possible to maintain a good sealability.

Further, in the present embodiment, the second mechanical seal 2b is also a non-contact type seal structure in the same way as the first mechanical seal 2a. The second hydrodynamic grooves 32 communicate with only part of the purge region A2, that is, the outer diameter side hollow portion A20. Further, the pressure of the purge region A2 is higher than the pressure of the outer region A3, so the purge fluid in the purge region A2 enters from the outer diameter side hollow portion A20 to the second hydrodynamic grooves 32, forms the sliding clearance C1 between the mutual seal surfaces together with the rotation of the shaft 4, and forms the barrier layer comprised of the purge fluid. Due to this barrier layer, it is possible to closely seal the space between the purge region A2 and the outer region A3.

Note that in many cases the pressure of the outer region A3 is lower than the pressure of the sealed fluid region A1. Also, as described before, the pressure of the purge region A2 is set higher than the pressure of the sealed fluid region A1. Therefore the pressure difference between the purge region A2 and the outer region A3 is larger than the pressure difference between the purge region A2 and the sealed fluid region A1. In the present embodiment by forming on the outer diameter side the second hydrodynamic groove 32 in the second mechanical seal 2b located between purge region A2 and outer region A3, it is possible to improve the sealability between these regions.

Further, in the present embodiment, the second non-rotating seal ring 70 is made of carbon, which is superior in slidability, so the sealing property is further improved.

Further, in the present embodiment, when the sealed fluid is a liquid, since the maximum depth of the first hydrodynamic grooves 22 is larger than the maximum depth of the second hydrodynamic grooves 32, it is possible to generate larger hydrodynamic effect at the seal surface 20a of the first mechanical seal 2a and the sealing property between the gas and liquid is further improved.

Note that the present invention is not limited to the above embodiment and may be changed in various ways within the scope of the present invention.

For example, in the above embodiment, the hydrodynamic grooves 22 and 32 are formed at the seal surfaces 20a and 30a of the rotating seal rings 20 and 30, but it is also possible to form the hydrodynamic grooves 22 and 32 in the seal surface of the non-rotating seal rings 60 and 70.

Further, in the present invention, the hydrodynamic grooves 22 and 32 are not limited to L-shapes and may also be T-shapes or spiral shapes.

Further, in the above embodiment, the second hydrodynamic grooves 32 in the second mechanical seal 2b are communicated with the outer diameter side hollow portion A20, but the second hydrodynamic grooves 32 may also be communicated with the inner diameter side hollow portion in the same way as the first hydrodynamic grooves 22. By adopting these configurations, it is possible to prevent effectively from lowering the pressure of the purge region as well as to improve sealing property.

Further, in the present invention, in accordance with the property of the sealed fluid the depth of the first hydrodynamic grooves 22 and the depth of the second hydrodynamic grooves 32 may be substantially the same.

What is claimed is:

1. A shaft seal device, comprising:
   a casing having a hollow portion;
   a rotatable shaft extending inside the casing from a sealed fluid region to an outer region;
   a non-contact type first mechanical seal arranged between the casing and the shaft so as to divide the hollow portion into the sealed fluid region and a purge region located between the sealed fluid region and the outer region; and a non-contact type second mechanical seal arranged between the casing and the shaft so as to divide the hollow portion into the purge region and the outer region, wherein the first mechanical seal comprises a first rotating seal ring having a first rotating seal surface rotating along with the shaft and a first non-rotating seal ring held by the casing and having a first non-rotating seal surface able to abut axially and slidable against the first rotating seal surface, a plurality of first dynamic pressure generating grooves communicating with the purge region are formed at the first rotating seal surface or the first non-rotating seal surface so as to extend from an inner edge thereof to an outer direction, each of the first dynamic pressure generating grooves has an L-shape seen from the seal surface and comprises a first radial portion communicating directly with the purge region and a first circumferential portion communicating with an outer diameter portion of the first radial portion and extending in the circumferential direction, a groove depth of the first circumferential portion of the first dynamic pressure generating groove becomes shallower along the circumferential direction of the first circumferential portion toward a circumferential edge of the first circumferential portion from a crossing point between the first radial portion and the first circumferential portion, the mutually adjoining first dynamic pressure generating grooves are arranged line symmetrically, the second mechanical seal comprises a second rotating seal ring having a second rotating seal surface rotating along with the shaft and a second non-rotating seal ring held by the casing and having a second non-rotating seal surface able to abut axially and slidable against the second rotating seal surface, a plurality of second dynamic pressure generating grooves are formed at the second rotating seal surface or the second non-rotating seal surface so as to extend from an outer edge thereof to an inner direction, each of the second dynamic pressure generating grooves has an L-shape seen from the seal surface and comprises a second radial portion communicating directly with the purge region and a second circumferential portion communicating with an inner diameter portion of the second radial portion and extending in the circumferential direction, a groove depth of the second circumferential portion of the second dynamic pressure generating groove becomes shallower along the circumferential direction of the second circumferential portion toward a circumferential edge of the second circumferential portion from a crossing point between the second radial portion and the second circumferential portion, the mutually adjoining second dynamic pressure generating grooves are arranged line symmetrically, the second non-rotating seal ring is made from carbon material, and a purge fluid higher in pressure than the pressure of the sealed fluid is fed into the purge region.

2. The shaft seal device as set forth in claim 1, wherein the pressure of the purge fluid acts as a back pressure into a back surface of the first non-rotating seal ring located at an opposite side of the first non-rotating seal surface and the first dynamic pressure generating grooves communicate with the purge region through an inner hollow portion located at an inner circumferential side of the first non-rotating seal ring.

3. The shaft seal device as set forth in claim 1, wherein the first rotating seal ring and the first non-rotating seal ring are comprised by a hard material with a hardness higher than that of a carbon.

4. The shaft seal device as set forth in claim 1, wherein the second non-rotating seal ring is constructed so that the pressure of the purge fluid acts as a back pressure into a back surface of the second non-rotating seal ring located at an opposite side of the second non-rotating seal surface.

5. The shaft seal device as set forth in claim 1, wherein depths of the first dynamic pressure generating grooves are larger than depths of the second dynamic pressure generating grooves.

6. The shaft seal device as set forth in claim 1, wherein the sealed fluid is a high viscosity liquid containing impurities.

7. The shaft seal device as set forth in claim 6, wherein the purge fluid is an inert gas.

\* \* \* \* \*